United States Patent Office 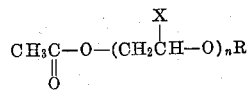

2,872,429
Patented Feb. 3, 1959

2,872,429
METHOD OF PREPARING ELASTOMERIC PLASTIGELS

Max M. Schwartz, Jersey City, N. J.; Minnie G. Schwartz, executrix of said Max M. Schwartz, deceased No Drawing. Application August 15, 1956
Serial No. 604,056

7 Claims. (Cl. 260—30.6)

This invention relates to thermoplastic gels and provides an improved method for preparing elastomeric plastigels at room temperature and atmospheric pressure. Elastomeric plastigels formed by the method of the invention are particularly suited for use in taking highly accurate and dimensionally stabile impressions from which precision castings may be molded.

The preparation of highly accurate impressions requires the use of an impression material having both a high degree of accuracy and suitable rheological properties. Although an unusually large number of elastomeric materials have been developed for inclusion in impression formulations, the elastomers generally have failed to provide accurate impressions which remain dimensionally unaltered for extended periods. The naturally occurring hydrocolloidal alginates, for example, have found wide acceptance in impression formulations, but have a high incidence of distortion and shrinkage after taking the impression. Because the dimensional stability of the alginates is negligible, stone or plaster molds of the impression must be poured immediately after taking the impression to avoid obtaining grossly inaccurate castings.

The serious limitation inherent in the alginate impression compositions has stimulated renewed interest in developing impression materials based on synthetic resins capable of being brought to an elastomeric condition in several minutes. Although certain of the plasticized thermoplastic resins, including the vinyl chloride-vinyl acetate copolymers, may be rapidly gelled to an elastomeric state by heating the plastisol with aluminum distearate, the gelled compositions undergo distortion on cooling and hence are incapable of being used to prepare highly accurate impressions. To obtain elastomeric gels at room temperature and atmospheric pressure, recourse has been made to adding various low-boiling gelling agents to certain organosols and plastisols, but the resultant elastomers generally possess physical properties analogous to the organogels inasmuch as shrinkage commences soon after gelation. Finished impressions taken with organogels lack dimensional stability because of the evaporation of the low-boiling gelling agents from the gelled structure.

Following an exhaustive investigation into the chemistry of the plastigels, I have discovered that certain thermoplastic resins may be irreversibly gelled, at room temperature and atmospheric pressure, to an elastomeric plastigel which remains dimensionally stabile at room temperature over long periods of time. Gelation of the thermoplastic resins may be accomplished either solely or in the presence of inert fillers and may be made to occur instantaneously or delayed for periods of time ranging from several minutes.

Based on these discoveries, the invention provides a method for preparing an elastomeric plastigel which comprises plasticizing a powdered thermoplastic resin of the group consisting of vinyl chloride-vinyl acetate copolymers containing from 85 to 91.5 percent by weight of vinyl chloride, methyl methacrylate-ethyl methacrylate copolymers containing at least 35 percent by weight of ethyl methacrylate, and homopolymers of ethyl methacrylate, with a compatible plasticizer for the thermoplastic resin and a sufficient quantity of at least one gelling accelerator of the group consisting of alkyl lactates having a vapor pressure at 20° C. of no greater than 0.4 mm. Hg and organic esters having the formula $$CH_3\underset{\underset{O}{\parallel}}{C}-O-(CH_2\underset{\underset{X}{|}}{C}H-O)_nR$$

in which X is a substituent selected from the group consisting of hydrogen and methyl, R is a substituent selected from the group consisting of hydrogen and acetyl, and $n$ is an integer from 1 to 3, to form the elastomeric plastigel. Secondary gelling agents, incapable of inducing gelation of the thermoplastic resin in several minutes by themselves, may be used in conjunction with the gelling accelerator to modify the rate of gelation and consequently alter the rheological properties of the resultant plastigel.

The term plastigel has been used previously in polymer nomenclature to define those vinyl pastes formed by gelling a plastisol with solid gelling agents. It now appears appropriate to enlarge the scope of this definition to include all gel-like structures prepared from the reaction of a thermoplastic resin, a non-volatile plasticizer and a substantially non-volatile gelling agent. As used herein, an elastomeric plastigel denotes the gel-like structures prepared from both polyvinyl and polyacrylate resins with a compatible plasticizer and a substantially non-volatile gelling accelerator having a vapor pressure at room temperature of no greater than 0.4 mm. Hg. Gel-like structures prepared from a thermoplastic resin using either volatile plasticizers or volatile gelling agents undergo shrinkage at room temperature because of the evaporation of one of the components, and are consequently designated herein as organogels.

Formation of an elastomeric plastigel may be accomplished by dispersing a predetermined quantity of the powdered resinous component in a liquid gelling solution containing the plasticizer and gelling accelerator. Alternatively, the elastomeric composition may be formed by initially plasticizing the powdered thermoplastic resin to a thin paste, and subsequently adding the gelling accelerator to the resultant plastisol to form the elastomeric plastigel. In either case, the gelation of the thermoplastic resin is substantially unaffected in the presence of inert fillers and pigments comprising up to about 50 percent by weight of the total solids used to form the plastigel.

Gelation of a thermoplastic resin to an elastomeric plastigel at atmospheric pressure and room temperature within a few minutes, I have found, is limited only to those resins which fall within the group consisting of vinyl chloride-vinyl acetate copolymers containing from 85 to 91.5 percent by weight of vinyl chloride, methyl methacrylate-ethyl methacrylate copolymers containing at least 35 percent by weight of ethyl methacrylate, and homopolymers of ethyl methacrylate. Other thermoplastic resins, such as the homopolymers of methyl methacrylate and of vinyl chloride, are incapable of gelling by themselves, at room temperature and atmospheric pressure, upon the addition of a liquid gelling solution, and hence are useful solely as inert fillers.

Using resins selected from the aforementioned group of active plastics, I have obtained particularly satisfactory impression compositions from a vinyl chloride-vinyl acetate copolymer containing about 90 percent by weight of vinyl chloride; one such copolymer is manufactured by the Bakelite Company under the designation "VYNS." Other preferred thermoplastic resins, which have been found to yield satisfactory impression compositions include a vinyl chloride-vinyl acetate-vinyl alcohol copolymer containing 91 percent by weight of vinyl chloride and 3 percent by weight of vinyl acetate (designated as "VAGH" by the Bakelite Company), and specially-prepared copolymers of ethyl methacrylate and methyl methacrylate containing about 90 percent by weight of ethyl methacrylate. These resins may be blended prior to gelation or gelled separately.

In general, all finely divided powders may be used as inert fillers with the powdered thermoplastic resin, and I have obtained suitable gelation with the use of such inorganic fillers as metallic stearates, ricinoleates, sulphates, carbonates, oxides, silicates, mica, kaolin, colloidal carbon, infusorial earth, naturally-occurring clays, and asbestos. In addition, several synthetic resins incapable of gelling at room temperature with the liquid gelling solution have been found to function as suitable fillers, and include polyvinyl chloride and polymethyl methacrylate. Particularly accurate impressions have been obtained, however, from plastigels containing barium sulfate and calcium carbonate.

The liquid gelling solution contains at least two functional components, namely a compatible plasticizer for the thermoplastic resin and a gelling accelerator selected from the group consisting of alkyl lactates having a vapor pressure at 20° C. of no greater than 0.4 mm. Hg and organic esters having the formula

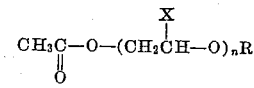

in which X is a substituent selected from the group consisting of hydrogen and methyl, R is a substituent selected from the group consisting of hydrogen and acetyl, and $n$ is an integer from 1 to 3. More than one plasticizer may be used in the gelling solution to modify the rheological properties of the resultant elastomeric plastigel. Similarly, the formulation of the liquid gelling solution may include a blend of several of the aforementioned gelling accelerators. To suitably gel the thermoplastic resin at room temperature, the liquid gelling solution should contain from about 96 to about 10 percent by volume of the plasticizer and from about 4 to about 90 percent by volume of the gelling accelerator.

As a general rule, any plasticizer capable of wetting, dissolving, or swelling the thermoplastic resins may be used in preparing the initial plastisol or in formulating the liquid gelling solution. Among the plasticizers which have been used are dialkyl phthalates, phosphates, sebacates, adipates, succinates, ricinoleates, butyrates, hexoates, and glycollates. In addition, several polymeric plasticizers, such as the polyacrylates, have been found suitable. Using such plasticizers as dioctyl phthalate and tricresyl phosphate, I have prepared particularly accurate elastomeric plastigels which remain dimensionally unchanged after several weeks' storage.

To cause rapid gelation of the powdered thermoplastic resin at room temperature, the liquid gelling solution must also contain at least one of the previously mentioned gelling accelerators in addition to a plasticizer. Ethylene glycol diacetate is the preferred gelling accelerator, but such compounds as ethylene glycol monoacetate, diethylene glycol monoacetate, diethylene glycol diacetate, triethylene glycol monoacetate, triethylene glycol diacetate, propylene glycol monoacetate, propylene glycol diacetate, and butyl lactate have been used with equal facility. In general, the time required for gelation of an elastomeric plastigel may be controlled by varying the amount of gelling accelerator in the liquid gelling solution. With liquid gelling solutions containing from 65 to 82 percent by volume of plasticizer and from 35 to 18 percent by volume of the gelling accelerator, I have been able to consistently form elastomeric plastigels which irreversibly gel in from three to seven minutes.

When longer gelation times are desired, a secondary gelling agent may be added to the liquid gelling solution as an adjunct to the gelling accelerator. Although secondary gelling agents per se are incapable of causing gelation of the thermoplastic resin within several minutes, these agents are effective synergists in combination with a gelling accelerator. The secondary gelling agents found effective include nonyl acetate, 2-ethylhexyl acetate, methyl carbitol acetate, butyl acetoacetate, carbitol acetate, triglycol dichloride, and butyl carbitol acetate.

The exact proportion of liquid gelling solution to powdered resinous component required to form an elastomeric plastigel is, of course, dependent on the particular formulation employed. Ordinarily an elastomeric plastigel may always be formed at room temperature by using a ratio of liquid gelling solution to thermoplastic resin of from 0.45:1 to 2.75:1 milliliters per gram. Elastomeric plastigels prepared by using a ratio of gelling solution to resin of from 0.7:1 to 1:1 milliliters per gram, however, are especially useful for taking highly accurate impressions.

To illustrate the preparation of several different elastomeric plastigels of vinyl chloride-vinyl acetate copolymers, Table I lists the composition of seven formulations which have been used to take accurate impressions. In

TABLE I

*Plastigels of vinyl chloride-vinyl acetate copolymers*

| Composition | 1 | 2 | 3 | 4 | 5 | 6 | 7 |
|---|---|---|---|---|---|---|---|
| A. Powdered Resinous Component (gm.): | | | | | | | |
| 90% Vinyl Chloride—10% vinyl acetate copolymer | 25.08 | 19 | 25.08 | 22.8 | 66 | 66 | 100 |
| 87% Vinyl chloride—13% vinyl acetate copolymer | | 12.5 | | 2.28 | | | |
| 91% Vinyl chloride—3% vinyl acetate—6% vinyl alcohol copolymer | | | | | | | |
| Polyvinyl chloride (filler) | 7.6 | 6.08 | 3.8 | 3.8 | 20 | 10 | |
| Barium sulfate | | 4.56 | 9.12 | 3.04 | | 8 | |
| Calcium stearate | | | | 0.76 | | 2 | |
| Calcium carbonate | 5.32 | | | 2.28 | 14 | 6 | |
| Infusorial earth | | | | 3.04 | | 8 | |
| B. Liquid Gelling Solution (ml.): | | | | | | | |
| Plasticizers— | | | | | | | |
| Dioctyl phthalate | 6.84 | 5.32 | 7.6 | | | 20 | |
| Tricresyl phosphate | 15.39 | 6.08 | 17.1 | | 30 | 45 | |
| Ethyl butyl phthalate | | | | | 15 | | |
| Dioctyl sebacate | | 3.04 | | | 5 | | |
| Santiciser 141 | | 5.32 | | 12.66 | | | |
| Butyl phthalyl butyl glycollate | | 5.32 | | 12.66 | | | |
| Dibutyl sebacate | | 3.04 | | | | | 95 |
| Gelling accelerators— | | | | | | | |
| Ethylene glycol monoacetate | | | | 12.66 | | | |
| Ethylene glycol diacetate | 8.89 | 9.88 | | | | | |
| Diethylene glycol diacetate | | | 9.88 | | | | |
| Triethylene glycol monoacetate | | | | | 15 | | |
| Triethylene glycol diacetate | | | | | | | 5 |
| Propylene glycol monoacetate | | | | | 5 | | |
| Triglycol dichloride (Secondary accelerator) | | | | | | 31 | |
| Butyl lactate | | | | | 30 | | |
| C. Ratio of B/A (ml./gm.) | 0.9:1 | 1:1 | 1:1 | 1:1 | 0.6:1 | 0.5:1 | 2.75:1 | each case, the plastigel was formed by dispersing the powdered resinous component in the liquid gelling solution, using the recommended ratio (B/A) of liquid to powder. All of the impressions taken with these plastigels were found to be dimensionally accurate after several days' standing, and could be used repeatedly to prepare precision castings of plaster or stone.

Plastigels of methyl methacrylate-ethyl methacrylate copolymers are illustrated in Table II, which sets forth seven additional formulations which have been found to be suitable for taking accurate impressions. With each formulation an elastomeric plastigel was prepared by dispersing the powdered resinous component in the liquid gelling solution, using the preferred ratio (B/A) of liquid to powder.

TABLE II

*Plastigels of methyl methacrylate-ethyl methacrylate copolymers*

| Composition | 1 | 2 | 3 | 4 | 5 | 6 | 7 |
|---|---|---|---|---|---|---|---|
| A. Powdered Resinous Component (gm.): | | | | | | | |
| Ethyl methacrylate homopolymer | 100 | 85 | 85 | 10 | | | 50 |
| 90% Ethyl methacrylate—10% methyl methacrylate copolymer | | | | 30 | | 100 | |
| 50% Ethyl methacrylate—50% methyl methacrylate copolymer | | | | 60 | 76 | | |
| Polyvinyl chloride (filler) | | | 20 | | | | |
| Barium sulfate | | | 15 | | 24 | | 50 |
| B. Liquid Gelling Solution (ml.): | | | | | | | |
| Plasticizers— | | | | | | | |
| Dioctyl phthalate | | 9 | 12 | | 53 | 12 | 95 |
| Tricresyl phosphate | 12.5 | 9 | | 40 | 20 | | |
| Gelling accelerators— | | | | | | | |
| Ethylene glycol monoacetate | | | | | | 48 | |
| Ethylene glycol diacetate | 37.5 | | | 60 | | | 5 |
| Diethylene glycol monoacetate | | | 42 | | | | |
| Propylene glycol diacetate | | | | 48 | | | |
| Butyl lactate | | | | | 26 | | |
| C. Ratio of B/A (ml./gm.) | 0.5:1 | 0.6:1 | 0.6:1 | 1:1 | 1:1 | 0.6:1 | 2.75:1 |

I claim:

1. The method of preparing an elastomeric plastigel which consists of combining, at room temperature and atmospheric pressure, a powdered thermoplastic resin of the group consisting of vinyl chloride-vinyl acetate copolymers containing from 85 to 91.5 percent by weight of vinyl chloride, ethyl methacrylate-methyl methacrylate copolymers containing at least 35 percent by weight of ethyl methacrylate, and ethyl methacrylate homopolymers, with a compatible plasticizer for the thermoplastic resin and a sufficient quantity of at least one gelling accelerator of the group consisting of alkyl lactates having a vapor pressure at 20° C. of no greater than 0.4 mm. Hg and organic esters having the formula

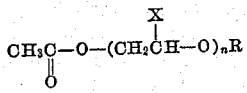

in which X is a substituent selected from the group consisting of hydrogen and methyl, R is a substituent selected from the group consisting of hydrogen and acetyl, and $n$ is an integer from 1 to 3, to form an elastomeric plastigel, said plastigel being combined in an amount of from 10% to 96% by volume of the total volume of said plasticizer and gelling accelerator, and said thermoplastic resin being combined in an amount of one gram to each 0.45 to 2.75 milliliters of the combined volume of said plasticizer and gelling accelerator.

2. The method of preparing an elastomeric plastigel which consists of adding at room temperature and atmospheric pressure a gelling accelerator having the formula

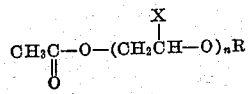

in which X is a substituent selected from the group consisting of hydrogen and methyl, R is a substituent selected from the group consisting of hydrogen and acetyl, and $n$ is an integer from 1 to 3, to a plastisol containing a powdered thermoplastic resin of the group consisting of vinyl chloride-vinyl acetate copolymers containing from 85 to 91.5 percent by weight of vinyl chloride, ethyl methacrylate-methyl methacrylate copolymers containing at least 35 percent by weight of ethyl methacrylate, and ethyl methacrylate homopolymers and a compatible plasticizer for said thermoplastic resin, to gel the plastisol and form an elastomeric plastigel, said gelling accelerator being added in an amount of from 4% to 90% by volume of the total volume of plasticiser and gelling accelerator in the plastigel and said thermoplastic resin being present in said plastigel in an amount of one gram to each 0.45 to 2.75 milliliters of gelling accelerator and plasticizer.

3. The method of preparing an elastomeric plastigel which consists of combining at room temperature and atmospheric pressure a powdered thermoplastic resin of the group consisting of vinyl chloride-vinyl acetate copolymers containing from 85 to 91.5 percent by weight of vinyl chloride, ethyl methacrylate-methyl methacrylate copolymers containing at least 35 percent by weight of ethyl methacrylate, and ethyl methacrylate homopolymers, with a liquid gelling solution in an amount of from 0.45 to 2.75 milliliters of said gelling solution to each gram of thermoplastic resin, said gelling solution containing from 10 to 96 percent by volume of a compatible plasticizer for the thermoplastic resin and from 4 to 90 percent by volume of at least one gelling accelerator having the formula

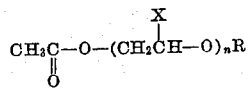

in which X is a substituent selected from the group consisting of hydrogen and methyl, R is a substituent selected from the group consisting of hydrogen and acetyl, and $n$ is an integer from 1 to 3, to form an elastomeric plastigel.

4. The method of preparing an elastomeric plastigel which consists of combining at room temperature and atmospheric pressure a powdered resinous vinyl chloride-vinyl acetate copolymer containing from 85 to 91.5 percent by weight of vinyl chloride in a liquid gelling solution in an amount of from 0.45 to 2.75 milliliters of said gelling solution to each gram of resinous copolymer, said gelling solution containing from 96 to 10 percent by volume of a compatible plasticizer for the copolymer and from 4 to 90 percent by volume of at least one gelling accelerator having the formula

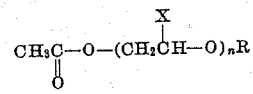

in which X is a substituent selected from the group consisting of hydrogen and methyl, R is a substituent selected from the group consisting of hydrogen and acetyl, and $n$ is an integer from 1 to 3, to form an elastomeric plastigel.

5. The method of preparing an elastomeric plastigel which consists of combining at room temperature and atmospheric pressure a powdered resinous methyl methacrylate-ethyl methacrylate copolymer containing at least 35 percent by weight of ethyl methacrylate in a liquid gelling solution in an amount of from 0.45 to 2.75 milliliters of said gelling solution to each gram of resinous copolymer, said gelling solution containing from 96 to 10 percent by volume of a compatible plasticizer for the copolymer and from 4 to 90 percent by volume of at least one gelling accelerator having the formula

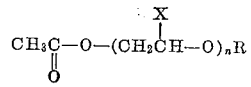

in which X is a substituent selected from the group consisting of hydrogen and methyl, R is a substituent selected from the group consisting of hydrogen and acetyl, and $n$ is an integer from 1 to 3, to form an elastomeric plastigel.

6. The method of preparing an elastomeric plastigel which consists of combining at room temperature and atmospheric pressure a powdered resinous ethyl methacrylate homopolymer in a liquid gelling solution in an amount of from 0.45 to 2.75 milliliters of said gelling soution to each gram of ethyl methacrylate, said gelling solution containing from 96 to 10 percent by volume of a compatible plasticizer for the homopolymer and from 4 to 90 percent by volume of at least one gelling accelerator having the formula

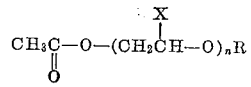

in which X is a substituent selected from the group consisting of hydrogen and methyl, R is a substituent selected from the group consisting of hydrogen and acetyl, and $n$ is an integer from 1 to 3, to form an elastomeric plastigel.

7. The method of preparing an elastomeric plastigel which consists of combining at room temperature and atmospheric pressure a powdered thermoplastic resin of the group consisting of vinyl chloride-vinyl acetate copolymers containing from 85 to 91.5 percent by weight of vinyl chloride, ethyl methacrylate-methyl methacrylate copolymers containing at least 35 percent by weight of ethyl methacrylate, and ethyl methacrylate homopolymers, in a liquid gelling solution in an amount of from 0.45 to 2.75 milliliters of said gelling solution to each gram of thermoplastic resin, said gelling solution containing from 96 to 10 percent by volume of a compatible plasticizer for the thermoplastic resin and from 4 to 90 percent by volume of ethylene glycol diacetate to form an elastomeric plastigel.

References Cited in the file of this patent
UNITED STATES PATENTS

| | | |
|---|---|---|
| 2,496,387 | Fink | Feb. 7, 1950 |
| 2,578,665 | Bjorksten et al. | Dec. 18, 1951 |